Oct. 25, 1938. J. G. DOUGLAS Re. 20,895

STEERING GEAR FOR MOTOR VEHICLES

Original Filed June 20, 1934 3 Sheets-Sheet 1

Inventor
JOHN GEORGE DOUGLAS,
BY
Toulmin & Toulmin
Attorneys

Oct. 25, 1938. J. G. DOUGLAS Re. 20,895
STEERING GEAR FOR MOTOR VEHICLES
Original Filed June 20, 1934 3 Sheets-Sheet 2
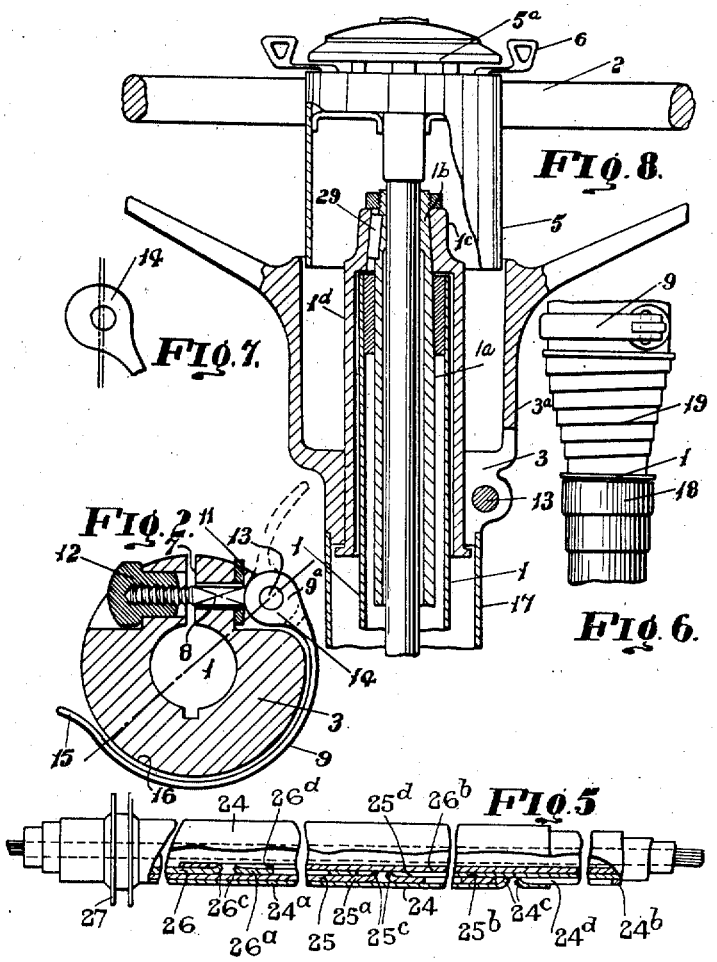
Inventor
JOHN GEORGE DOUGLAS,
By
Baldwin & Baldwin
Attorneys Oct. 25, 1938. J. G. DOUGLAS Re. 20,895
STEERING GEAR FOR MOTOR VEHICLES
Original Filed June 20, 1934 3 Sheets-Sheet 3
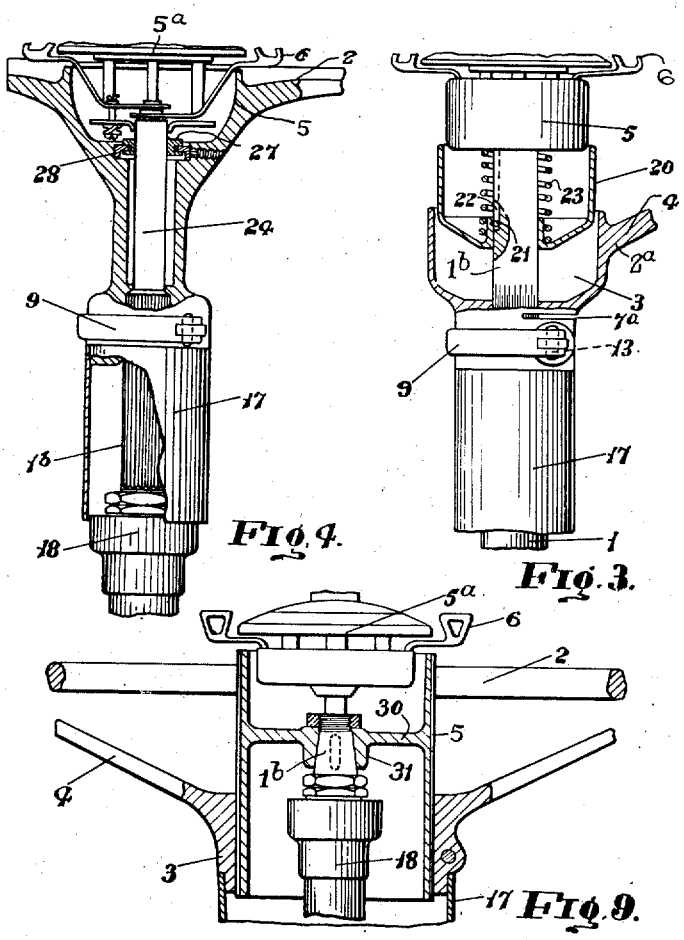
Inventor
JOHN GEORGE DOUGLAS,
By
Boulwin & Boulwin
Attorneys Reissued Oct. 25, 1938

Re. 20,895

UNITED STATES PATENT OFFICE 20,895

STEERING GEAR FOR MOTOR VEHICLES

John George Douglas, Aberfeldy, Scotland, assignor to Bluemel Bros. Limited, Wolston, near Coventry, England, a company of Great Britain Original No. 2,023,670, dated December 10, 1935, Serial No. 731,457, June 20, 1934. Application for reissue March 17, 1937, Serial No. 131,460. In Great Britain October 17, 1933

23 Claims. (Cl. 74—493)

My present invention relates to steering gear of motor vehicles. The present practice with motor road vehicles is to provide an adjustable driver's seat so that the most comfortable position relative to the clutch, brake or other control pedals can be obtained by drivers of varying leg lengths, but if the steering wheel rim remains fixed and cannot be adjusted equally with the seat the position of said rim relative to the driver will obviously be incorrect. For example if the seat be adjusted forwards for a short driver, the steering wheel rim will be too close to his body and may even almost touch his chin or chest, and conversely, a tall driver will have to reach forward to the steering wheel, the result being inadequate control of the car and discomfort to the driver. To compensate for this disadvantage it has heretofore been proposed to provide an adjustable steering column of a telescopic nature.

The primary object of my present invention is to provide an adjustable steering wheel which meets the requirements of modern practice.

One form of my invention briefly consists in extending the rotatable upper end of the inner column to which the steering wheel is attached, beyond the usual fixed outer column, to an extent appreciably greater than that required to receive the central boss of the steering wheel; both the bore of the steering boss and such above mentioned extension of inner column are provided with any suitable means such as feathers or splines so that while said steering wheel can slide axially no relative rotational movement can occur between steering wheel and inner column; any suitable means such as sawcut and pinch bolt in steering wheel boss, clamp bolt in steering wheel boss similar to those sometimes used for securing tool shanks in turret lathes, set bolt with eccentric plain stem, or the like, is provided so that the steering wheel can be firmly fixed either by spanner or hand operation at any selected position within the range of such extension of inner column as may be required by the driver. The means adopted to fix such selected position as above mentioned may be of a semi-permanent nature requiring the use of a spanner or the like, or some suitable form of quick-acting clamp such as a wing pinch bolt or the eccentric bolt above mentioned or the cam lock hereinbelow described may be used so that immediate adjustment can be effected without the use of tools or spanners.

Referring to the drawings:—

Figure 2 is a sectional plan view taken on the line 2*a*—2*a* of Figure 1 but showing a keyway in the steering wheel boss instead of a serrated or splined shaft.

Figure 3 is a part sectional side view of the steering wheel and column similar to Figure 1 incorporating a modification thereof.

Figure 4 is a similar view to Figure 3 only showing a further embodiment of my invention.

Figure 5 is a part sectional view of the steering inner control tubes as adapted to the arrangement shown in Figure 4.

Figure 6 is a view showing an alternative arrangement of the wheel and central boss.

Figure 7 is a view showing more clearly the cam employed in Figure 2.

Figures 8 and 9 show two further embodiments of the invention.

Figure 1:
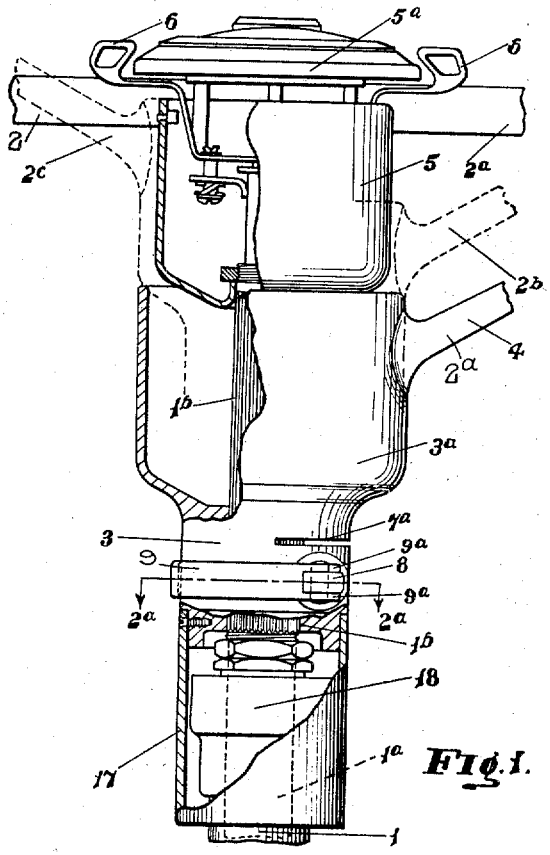
Figure 1 is a part sectional side view of the steering wheel and column in a preferred form of my invention.

Referring to the accompanying drawings, I provide an outer fixed column 1, and above this I extend the top portion of the inner column 1*a* a number of inches as denoted at 1*b*, according to what extent of adjustment is required, for example, six inches, such extension being obtained by merely lengthening the usual spline or in the case where a keyway and key is employed by extending these parts. The steering wheel 2 comprises a central boss 3, see note on drawing, shorter than such inner column extension 1*b*, for example two inches long, with any suitable number of arms 4 radiating therefrom to the usual outer rim. The upper part of said boss 3 is in the form of a cup or pan 3*a*, in this case 3″ deep to receive the control head casing 5, which in this case is also 3″ deep (or long), and is fast to and rotates with the extended portion 1*b* of the inner column 1*a*. The thumb levers 6 for operating the headlights, ignition, throttle or other desired control tube or control tubes that pass down the inner column 1*a* and its extension 1*b* are suitably attached to such inner control tubes and the stator tube 24 and do not rotate with the inner column extension 1*b*, the control head casing 5 being usually mounted at top end of inner column 1*a*, so that when steering wheel 2 is adjusted to its uppermost position such control head casing 5 fits nicely in the cup or pan 3*a* of the boss 3 but does not touch it. In order that such thumb levers 6 shall not project unduly above the plane of the steering wheel rim 2 when the steering wheel is adjusted to its lowest position as for example for a very short driver, I do not make the said steering wheel arms 4 at right angles to axis of column but inclined to such axis so that even with steering wheel in its lowest position the said thumb levers 6 and control head 5a shall be flush with or only project from plane of steering wheel rim by a predetermined suitable distance so as to avoid the possibility of interference with the driver's arms or coat sleeves when operating the steering wheel. The steering wheel in its lowest position is denoted by the reference numeral 2a and the mid-position and uppermost position by the reference numerals 2b and 2c respectively. When the steering wheel is in its uppermost position, as shown at 2c, as for example for a very tall driver, the said thumb levers 6 and control head 5a lie appreciably below the plane of the steering wheel rim, but their relation to the said cup or pan 3a in the upper part of said steering wheel boss 3 and to the inclined arms or spokes of steering wheel is so arranged that the said thumb levers are accessible to the driver.

I provide a bore in the steering wheel boss 3 which is a nice sliding fit on the upper extension 1b of inner column 1a either with a serrated surface or as shown in Figure 2 with a keyway to suit the key or feather on such extension 1b, and I partially split the lower portion of such boss 3 longitudinally and circumferentially as shown at 7 (see Figure 2) and 7a (see Figures 1 and 3) by means of a circular cutter, and fit a pinch bolt 8 at right angles to axis of said bore so that boss 3 can be firmly clamped to said extension at any selected position between the uppermost and lowest points provided. The method of clamping the said boss 3 can comprise a lever 9 having one end 9a forked, said forked portion receiving the drawbolt eye, and being held in position by a pin 13, the said forked portion being in the form of a cam 14 and adapted when the lever is in the position shown in Figure 2 to bear against a washer 11 and to take up any degree of slackness existing between the boss 3 and the column 1a. In practice the tension caused by operation of the lever 9 and cam 14 is regulated by means of a nut 12 screwed on to one end of the drawbolt 8. Hand operation of lever 9 to position shown dotted (Figure 2) releases such tension and permits the boss 3 to be slid axially along the column 1a, and returning lever 9 to its closed position restores the tension and exercises a gripping action on the boss to maintain it in any selected position. Figure 7 shows more clearly the cam 14 formed eccentrically about the pin 13. It will be seen that the curve of the lever 9 extends past a diameter of the wheel hub 3, measured from the centre of the cam pin 13, so that when closing the cam 14, the point denoted by the reference numeral 15 on the lever 9 has to spring slightly over the contact point on hub 16; this ensures the lever 9 remaining snugly against the hub 3. The cam periphery and the washer 11 are of course hardened. I also provide a sleeve or extension 17 of said boss 3 of steering wheel, extending downwards and of such lengths as to cover the ballrace or other mechanism 18 situated usually at the top end of the fixed outer column 1 before referred to, the bore of said sleeve 17 being clearance fit over such ballrace or other mechanism 18 so that the steering wheel 2 and sleeve 17 can rotate freely, and the length of said sleeve 17 being such as to cover such ballrace 18 or the like even when the steering wheel is adjusted to its uppermost position as shown at 2c; I do this so that a neat and solid appearance shall always be apparent whatever the selected position may be of the steering wheel, and so that the detrimental appearance of a portion of the inner column extension between steering wheel boss and top end of outer column shall be avoided when the steering wheel is adjusted elsewhere than in the lowest position shown at 2a. The said sleeve 17 may be integral with the boss 3 of the steering wheel or may be a separate portion suitably attached thereto, for example as shown in Figure 6, the said sleeve 17 can be replaced by an extensible volute type shroud 19 fixed at one end to the boss and at its other end to the column 1, thereby obtaining a telescopic form of shroud.

Referring to embodiment disclosed in Figure 3, in order to conceal the spline, or upper serrated or keywayed extension of the column 1a, and minimize the apparent length of wheel hub 3, especially when in the lower positions 2a and 2b, there is in addition to the boss 3 and control casing 5, a supplementary tubular shroud 20; which can slide axially on the extension 1b, its movement being limited by the travel of a pin 21 engaging in a keyway 22 formed in the extension 1b of the inner column; a spring 23 normally retaining the shroud in its lowest position, where it covers the gap between the control casing 5 and the boss or cup 3 when the wheel is in its lowest position. Raising the wheel first causes the shroud 20 to enter the boss 3, so that in middle position the shroud 20 is entirely located within the boss 3; further raising carries the shroud 20 with the boss 3 over the control casing 5, compressing the spring 23, so that in the top position of wheel only the boss or outside cup can be seen, both control casing 5 and shroud 20 being telescoped inside the boss 3.

Referring to Figures 4 and 5, the control head 5a rises and falls with the wheel and a dished wheel is not therefore necessary.

To permit of this, the stator tube 24 disposed within the inner column 1a is made in two parts, namely an upper part 24a and a lower part 24b, the latter having a diameter less than the diameter of the upper part.

The lower part 24b of the stator tube is held against rotation and end movement at the bottom of the steering gear box, and the two parts are connected slidably and non-rotatably together by providing the upper part 24a at its lower end with a key 24c which engages in a keyway 24d formed in the upper end of the lower part of the stator tube 24b.

Arranged within the stator tube 24 are control tubes 25, 26, and these are each formed similarly in two parts, namely an upper part 25a, 26a, and a lower part 25b, 26b of lesser diameter respectively; the two parts of each control tube being connected slidably and non-rotatably together in the same manner by providing each upper part at its lower end with keys 25c, 26c which engage respectively with keyways 25d, 26d provided in the upper ends of the corresponding lower parts of the control tubes.

The thumb levers 6 are attached to the upper parts of the control tubes and rise and fall with the control head 5a, while the lower parts 25b and 26b of the control tubes which protrude through the steering gear box are prevented from endwise movement in any convenient way as, for example, by the operating levers on these parts bearing on one side against the box bottom end plate and on the other side against the face of the usual switch box attached to the steering gear box but at some distance from its bottom end plate.

In order to ensure that the control head 5a and thumb levers 6 will rise and fall with the wheel, the upper part 24a of the stator tube is provided with a circumferentially grooved ferrule 27 in which rotates a collar 28 attached to the wheel so that when the height of the wheel is adjusted the upper part of the stator tube and of each control tube move axially in relation to the lower parts of these tubes which are stationary.

In the event of the control thumb levers being mounted elsewhere than on the control head 5a, or only such controls as require wiring through the column such as a horn and/or lamp switch, such controls can be accommodated in or on and attached to the boss of the wheel, and can rotate with the wheel 2 and in this respect control tubes and the stator tubes 24 such as are described with reference to Figures 4 and 5 are not required. Referring to Figure 8, the inner column 1a is extended as shown at 1b and has affixed to its upper end 1c by a taper and key 29 a depending sleeve-like member 1d which extends down over the usual fixed outer column or tube 1, the said sleeve-like member 1d being formed with splines or feathers upon which slidably fits the boss 3.

Figure 9 shows an arrangement in which the control head casing 5 is connected to the top of the extension 1b of the inner column by means of a flange 30 radiating from the medial portion and terminating in a boss 31 affixed to the upper end of such extension 1b, the boss 3 in this arrangement slidably fitting about splines or feathers on the outer surface of the control head casing 5.

What I claim then is:—

1. In steering mechanism for motor road vehicles, an outer stator tube, a steering column rotatable in and extending above said stator tube, a steering wheel, a central boss carried by said steering wheel adjustable axially with the wheel relatively to the steering column, a clamp for selectively clamping said boss to a plurality of different points of said steering column above said stator tube, upper and lower tubular parts on said boss adapted to obscure the mechanism of the usual controlling means in the upper end of the steering column, and also the part of the steering column above said stator tube.

2. In steering mechanism for motor road vehicles, a stator tube, a steering column rotatable and extending above the stator tube, a steering wheel, a central boss carried by said steering wheel adjustable with the wheel axially relatively to the steering column, a control head in the center of the steering wheel carried above said column, a device for readily clamping the said boss to different parts of the steering column above the stator tube, and a housing interposed between said boss and the control head of the steering column and adapted when the said wheel is lowered to surround the part of the steering column extending above the center of the steering wheel.

3. In steering mechanism for motor road vehicles, a rotatable steering column, a steering wheel, a central boss carried by said steering wheel adjustable axially with the wheel relatively to the steering column and a tubular extension on said boss enclosing the upper part of the steering column for the various positions of adjustment of said boss, a fixed outer stator tube above which the steering column extends to provide a part in prolongation of the stator tube along which the said boss is adjustable axially, co-operating opposed serrated surfaces on said boss and the prolonged part of the steering column, and means for selectively clamping said boss to different parts of said prolonged part of the steering column.

4. In steering mechanism for motor road vehicles, a stator tube, a rotatable steering column in said tube and extending above it, a steering wheel, a central boss carried by said steering wheel adjustable axially with the wheel relatively to the part of the steering column extending above said tube, a device for readily fixedly securing said boss to different parts of said rotatable steering column, a control head carried above said column, a housing interposed between said boss and the control head adapted when the said wheel is lowered to surround the part of the steering column extending above the boss of the steering wheel, and spring means within said housing to move the housing to said surrounding position when the wheel is lowered.

5. In steering mechanism for motor road vehicles, an outer stator tube, a steering column rotatable therein, a steering wheel, a central boss carried by said steering wheel adjustable axially with the wheel relatively to the steering column, a tubular extension on said boss enclosing the upper part of the steering column for various positions of adjustment of said boss, said boss being split, and means cooperating with said split boss to contract it upon the steering column to selectively clamp the boss to different parts of the steering column.

6. In steering mechanism for motor road vehicles, a rotatable steering column, a steering wheel, a fixed outer column, said steering column being extended above said outer column, a central boss carried by said steering wheel adjustable axially with the wheel relatively to said upwardly extended part of the steering column, and a tubular extension on said boss enclosing the said upwardly extended part of the steering column for various positions of adjustment of said boss, said boss being split, a bolt passed through the split part of the boss, serrations on said boss, and on said extended part of the steering column, a lever pivoted to one end of said bolt, and a cam on said lever adapted to press the opposed faces of the split part of the boss towards each other, so as to grip the serrations of the boss upon the serrations of the steering column.

7. In steering mechanism for motor road vehicles, an outer stator tube, a steering column rotatable in said stator tube, a steering wheel, a central boss carried by said steering wheel adjustable axially with the wheel relatively to the steering column, said boss being split, a bolt-like member passed through the split part to selectively clamp the boss fast to the steering column at a plurality of positions, an arcuately shaped lever partly disposed circumferentially about the boss carried by one end of said bolt-like member and adapted to be hand-operated, a cam at one end of said lever, and an abutment formed in the periphery of the boss against which said cam bears, said cam end being pivoted to an end of said bolt-like member projecting beyond said abutment, a nut in the other end of the threaded member abutting against part of said boss on the opposite side of the split containing said abutment.

8. In steering mechanism for motor road vehicles, a stator tube, a steering column rotatable therein, a steering wheel, a central boss carried by said steering wheel adjustable axially with the wheel along and relatively to the upper part of the steering column, means for selectively clamping said boss to different parts of said steering column, and a telescopic tubular extension on said boss enclosing the upper part of the steering column for various positions of adjustment of said boss.

9. In steering mechanism for motor road vehicles, a stator tube, a steering column rotatable therein, a steering wheel, a central boss carried by said steering wheel adjustable axially with the wheel along and relatively to the upper part of the steering column, means for selectively clamping said boss to different parts of said steering column, and a telescopic tubular extension on said boss enclosing the upper part of the steering column for various positions of adjustment of said boss, said extension comprising a volute spring.

10. In steering mechanism for motor road vehicles, a rotatable steering column, a fixed outer column, a steering wheel adjustable axially along and relatively to the steering column and means for selectively locking the steering wheel to different parts of the steering column for its various positions of adjustment, and a telescopic control tube in the column adapted to be altered in its effective length in conjunction with the axial adjustment of the wheel.

11. In steering mechanism for motor road vehicles, a rotatable steering column, a steering wheel, a central boss carried by said steering wheel adjustable axially with the wheel relatively to the steering column, means to clamp the said boss selectively to different parts of the steering column, and a number of telescopic control tubes in the steering column adapted to be altered in their effective length in conjunction with the axial adjustment of the steering wheel.

12. In steering mechanism for vehicles, a rotatable steering column, a bearing supporting said column adjacent the upper end thereof, said column including a part which extends beyond said bearing, a steering wheel adjustable axially upon the steering column, said wheel in all its positions of adjustment being supported from that part only of the column which is beyond said bearing and at a position on said part which is closely adjacent to said wheel, and means adapted to lock said wheel to the steering column to secure it in its various positions of adjustment.

13. In steering mechanism for vehicles, a rotatable steering column, a bearing supporting said column adjacent the upper end thereof, said column including a part which extends beyond said bearing, a steering wheel having a tubular boss mounted on said extended part, said boss and wheel being adjustable on said part axially of the steering column, said boss having a portion contractible inwardly into clamping engagement with said column part, and means mounted on said boss adapted to contract said portion into clamping engagement with said column part to secure the wheel in its adjusted position.

14. In steering mechanism for motor road vehicles, a rotatable steering column, a bearing supporting said column adjacent the upper end thereof, said column including a part which extends beyond said bearing, a steering wheel having a tubular boss mounted on said extended part, said boss and wheel being adjustable on said part axially of the steering column, said wheel boss in all its positions of adjustment being supported from that part only of the column which is beyond said bearing, means adapted to lock said wheel boss to said column part and secure the steering wheel in its various positions of adjustment, and a telescopic cover extending from said bearing to said wheel boss adapted to cooperate with said wheel boss in shielding said column part from view.

15. In steering mechanism for motor road vehicles, a rotatable steering column, a steering wheel having a hollow boss supported from said column, control operating means within said hollow boss, said steering wheel and control operating means being adjustable together axially of said column, means adapted automatically on adjustment of said wheel in both directions axially of the column to adjust said control operating means therewith, and means adapted to secure said wheel in relation to the column at its various positions of adjustment.

16. In steering mechanism for vehicles comprising a steering column provided at its upper end with a serrated part, a steering wheel having a tubular boss provided internally with serrations adapted for slidable and non-relatively rotatable engagement with the serrated part at the upper end of said steering column, said boss being contractible inwardly, manually operable locking means on said boss adapted to contract said boss to bring the serrations thereon into close contact with the serrations on said column part, and a tubular cover mounted on said boss adapted to enclose the serrated part of said column for various positions thereon of said wheel boss.

17. In steering mechanism for vehicles, an axially immovable, rotatable steering column, means for supporting said column for rotation adjacent its upper end and beyond which the steering column extends, a steering wheel slidably and reciprocably mounted on said column and adapted by its mounting to rotate therewith, means to lock said steering wheel at different positions on the column and interengaging wedging means between said steering column and said steering wheel to cause the rotation of said column and said wheel together whereby said interengaging means will be in wedging engagement when the wheel and steering column are locked to one another.

18. In steering mechanism for road vehicles, a rotatable steering column, means for supporting said column for rotation without axial movement, a rotatable steering wheel reciprocably mounted on the upper end of said column so as to rotate with the steering column and adapted to slide vertically with respect to the steering column, said column having interengaging splines with a hub of said wheel and a shield mounted on said hub extending beyond the splines on said hub adapted to enclose and conceal said splines irrespective of the relative position of the wheel with respect to the column, and means for locking said wheel on the column in a variety of different vertical positions.

19. In steering mechanism for vehicles, a rotatable steering column, a steering wheel, spigot and sleeve portions associated one with said wheel and the other with said column, said portions being relatively slidable axially of the column, interengaging relatively slidable serrations connecting said portions non-rotatably to each other, means for releasably bringing said serrations into close contact with each other to secure said wheel rigidly in the desired adjusted position relative to said column, and means shielding said spigot serrations from view for all positions of adjustment of said wheel.

20. In steering mechanism for vehicles, a rotatable steering column, a steering wheel, spigot and sleeve portions associated one with said wheel and the other with said column, said portions being relatively slidable axially of the column, interengaging relatively slidable serrations connecting said portions non-rotatably to each other, means for releasably bringing said serrations into close contact with each other to secure said wheel rigidly in the desired adjusted position relative to said column, and a telescopic cover extending from said column to said wheel enclosing the serrations on said spigot portion.

21. In steering mechanism for vehicles, a steering column, means adjacent the upper end of said column for supporting it for rotation, said column including a part which extends beyond said supporting means, a steering wheel adjustable axially of the steering column, said wheel in all its positions of adjustment being supported from that part only of the column which is beyond said supporting means, contractible means adapted to clamp said wheel to the steering column to secure it in its various positions of adjustment, and means adapted to effect said contraction.

22. In steering mechanism for vehicles, a steering column, means adjacent the upper end of said column for supporting it for rotation, a steering wheel, spigot and sleeve portions, one of said portions being associated with said column and extending therefrom beyond said supporting means, the other of said portions being associated with said wheel, said portions being non-relatively rotatable but relatively slidable axially of the column, said wheel in all its positions of adjustment being supported from that part only of said column portion which is beyond said supporting means, said sleeve portion being contractible into clamping engagement with said spigot portion, and means adapted to effect said contraction.

23. In steering mechanism for vehicles, a steering column, means adjacent the upper end of said column for supporting it for rotation, a steering wheel, spigot and sleeve portions, one of said portions being associated with said column and extending therefrom beyond said supporting means, the other of said portions being associated with said wheel, said portions being relatively slidable axially of the column, interengaging relatively slidable splines connecting said portions non-rotatably to each other, said wheel in all its positions of adjustment being supported from that part only of said column portion which is beyond said supporting means, said sleeve portion being contractible into clamping engagement with said spigot portion, and means adapted to effect said contraction.

JOHN GEORGE DOUGLAS.